US009230008B2

(12) United States Patent
Shuma et al.

(10) Patent No.: US 9,230,008 B2
(45) Date of Patent: Jan. 5, 2016

(54) SYSTEM AND METHOD FOR AUTOMATED ONLINE REORGANIZATION OF SEQUENTIAL ACCESS DATABASES

(75) Inventors: Kevin P. Shuma, Celina, TX (US); Joseph B. Lynn, Plano, TX (US); Robert Florian, Dallas, TX (US)

(73) Assignee: CA, Inc., New York, NY (US)

( * ) Notice: Subject to any disclaimer, the term of this patent is extended or adjusted under 35 U.S.C. 154(b) by 410 days.

(21) Appl. No.: 13/444,951

(22) Filed: Apr. 12, 2012

(65) Prior Publication Data

US 2013/0275367 A1 Oct. 17, 2013

(51) Int. Cl.
*G06F 17/30* (2006.01)

(52) U.S. Cl.
CPC .... *G06F 17/30595* (2013.01); *G06F 17/30303* (2013.01); *G06F 17/30339* (2013.01)

(58) Field of Classification Search
CPC ................... G06F 17/30595; G06F 17/30339; G06F 17/30303
USPC ......................................... 707/609, 693, 714
See application file for complete search history.

(56) References Cited

U.S. PATENT DOCUMENTS

| 5,596,747 | A | 1/1997 | Katabami et al. ............. 707/687 |
|---|---|---|---|
| 5,999,943 | A | 12/1999 | Nori et al. ................. 1/1 |
| 6,061,678 | A | 5/2000 | Klein et al. ................ 1/1 |
| 6,122,640 | A | 9/2000 | Pereira ........................ 707/648 |
| 6,144,970 | A | 11/2000 | Bonner et al. .............. 1/1 |
| 6,209,000 | B1 | 3/2001 | Klein et al. ................. 707/741 |
| 6,223,182 | B1 | 4/2001 | Agarwal et al. ............ 1/1 |
| 6,243,718 | B1 | 6/2001 | Klein et al. ................ 1/1 |
| 6,349,310 | B1 | 2/2002 | Klein et al. ................ 707/703 |
| 6,411,964 | B1 | 6/2002 | Iyer et al. ................... 1/1 |
| 6,606,626 | B1 | 8/2003 | Ponnekanti ................. 1/1 |
| 6,738,790 | B1 | 5/2004 | Klein et al. ................ 1/1 |
| 7,519,637 | B2 * | 4/2009 | Shuma et al. ............... 1/1 |
| 8,225,063 | B2 | 7/2012 | Sita .......................... 711/167 |
| 8,549,222 | B1 | 10/2013 | Kleiman et al. ............ 711/114 |
| 8,566,308 | B2 | 10/2013 | Musial et al. .............. 707/719 |
| 2006/0036618 | A1 * | 2/2006 | Shuma et al. .............. 707/100 |
| 2007/0016582 | A1 | 1/2007 | Kawamura et al. ........ 707/7 |
| 2012/0246160 | A1 * | 9/2012 | Thomsen et al. ........... 707/737 |
| 2013/0013651 | A1 | 1/2013 | Shuma |

(Continued)

OTHER PUBLICATIONS

Hitachi, "HiRDB Version 8 Description", Mar. 2007, Hitachi, Edition 1, pp. 285-293.*

(Continued)

*Primary Examiner* — Apu Mofiz
*Assistant Examiner* — Jared Bibbee
(74) *Attorney, Agent, or Firm* — Myers Bigel Sibley & Sajovec, P.A.

(57) ABSTRACT

Various systems, non-transitory computer readable media, and methods reorganize data records of a database in response to an efficiency parameter. A system may use an efficiency parameter that indicates a satisfactory level of organizational efficiency of at least a portion of a database table having a group of rows stored using a plurality of data blocks. The system may determine an efficiency of the group of rows based on a number of data block changes that occur during a sequential access of the group of rows. When the determined efficiency is less than the efficiency indicated by the efficiency parameter, the server may generate a control card to reorganize the group of rows when the efficiency is not satisfactory. The control card is used by an online reorganization process that reorganizes the group of rows.

22 Claims, 9 Drawing Sheets

(56) References Cited

U.S. PATENT DOCUMENTS

2013/0031084 A1* 1/2013 Herrnstadt ................ 707/714
2013/0103655 A1* 4/2013 Fanghaenel et al. ........ 707/693
2013/0275367 A1* 10/2013 Shuma et al. .............. 707/609

OTHER PUBLICATIONS

Gary H. Sockut and Balakrishna R. Iyer, "Online Reorganization of Databases", Jul. 2009, ACM, vol. 41, pp. 1-136.*

* cited by examiner

| DATA ROW | 1 | 2 | 3 | 4 | 5 | 6 | 7 | 8 | 9 | 10 | 11 | 12 | 13 | 14 | 15 | 16 | 17 | 18 | 19 | 20 | 21 | 21 DATA ROW KEY VALUES |
|---|---|---|---|---|---|---|---|---|---|---|---|---|---|---|---|---|---|---|---|---|---|---|
| DATA BLOCK | 1 | 1 | 1 | 1 | 1 | 2 | 2 | 2 | 2 | 2 | 3 | 3 | 3 | 3 | 3 | 4 | 4 | 4 | 4 | 4 | 5 | BLOCKS IN USE = 5 |
| BLOCK CHANGE |   |   |   |   |   | 1 |   |   |   |   | 2 |   |   |   |   | 3 |   |   |   |   | 4 | BLOCK CHANGES = 4 |
|   |   |   |   |   |   |   |   |   |   |   |   |   |   |   |   |   |   |   |   |   |   | CALC EFFICIENCY |
|   |   |   |   |   |   |   |   |   |   |   |   |   |   |   |   |   |   |   |   |   |   | (5-1) / 4 = 100% |

FIG. 2A

| DATA ROW | 1 | 2 | 3 | 4 | 5 | 6 | 7 | 8 | 9 | 10 | 11 | 12 | 13 | 14 | 15 | 16 | 17 | 18 | 19 | 20 | 21 | 21 DATA ROW KEY VALUES |
|---|---|---|---|---|---|---|---|---|---|---|---|---|---|---|---|---|---|---|---|---|---|---|
| DATA BLOCK | 1 | 2 | 1 | 1 | 1 | 3 | 2 | 2 | 2 | 2 | 1 | 3 | 4 | 4 | 4 | 3 | 3 | 4 | 5 | 4 | 3 | BLOCKS IN USE = 5 |
| BLOCK CHANGE |   | 1 | 2 |   |   | 3 | 4 |   |   |   | 5 | 6 | 7 |   |   | 8 |   | 9 | 10 | 11 | 12 | BLOCK CHANGES = 12 |
|   |   |   |   |   |   |   |   |   |   |   |   |   |   |   |   |   |   |   |   |   |   | CALC EFFICIENCY |
|   |   |   |   |   |   |   |   |   |   |   |   |   |   |   |   |   |   |   |   |   |   | (5-1) / 12 = 33% |

FIG. 2B

| DATA ROW | 1 | 2 | 3 | 4 | 5 | 6 | 7 | 8 | 9 | 10 | 11 | 12 | 13 | 14 | 15 | 16 | 17 | 18 | 19 | 20 | 21 | 21 DATA ROW KEY VALUES |
|---|---|---|---|---|---|---|---|---|---|---|---|---|---|---|---|---|---|---|---|---|---|---|
| DATA BLOCK | 1 | 2 | 1 | 1 | 1 | 3 | 2 | 2 | 2 | 2 | 1 | 3 | 4 | 4 | 4 | 3 | 3 | 4 | 5 | 4 | 3 | BLOCKS IN USE = 5 |
| BLOCK CHANGE | | 1 | 2 | | | 3 | 4 | | | | | 5 | 6 | 7 | | | 8 | | 9 | 10 | 11 | 12 | BLOCK CHANGES= 12 |
| | | 1 | | | | 2 | 3 | | | | | 4 | 5 | 6 | | | | | 7 | | | 8 | CALC EFFICIENCY |
| | | | | | | | | | | | | | | | | | | | | | | | (5-1) / 12 = 33% |
| | | | | | | | | | | | | | | | | | | | | | | | |
| | | | | | | | | | | | | | | | | | | | | | | | |
| BUFFER A | 1 | 1 | 1 | 1 | 1 | 1 | 2 | 2 | 2 | 2 | 2 | 3 | 3 | 3 | 3 | 3 | 3 | 3 | 5 | 5 | 3 | (5-1) / 8 = 50% WITH BUFFERS 2 |
| BUFFER B | | 2 | 2 | 2 | 2 | 3 | 3 | 3 | 3 | 3 | 1 | 1 | 4 | 4 | 4 | 4 | 4 | 4 | 4 | 4 | 4 | |

FIG. 3A

| DATA ROW | 1 | 2 | 3 | 4 | 5 | 6 | 7 | 8 | 9 | 10 | 11 | 12 | 13 | 14 | 15 | 16 | 17 | 18 | 19 | 20 | 21 | 21 DATA ROW KEY VALUES |
|---|---|---|---|---|---|---|---|---|---|---|---|---|---|---|---|---|---|---|---|---|---|---|
| DATA BLOCK | 1 | 2 | 1 | 1 | 1 | 3 | 2 | 2 | 2 | 2 | 1 | 3 | 4 | 4 | 4 | 3 | 3 | 4 | 5 | 4 | 3 | BLOCKS IN USE = 5 |
| BLOCK CHANGE | | 1 | 2 | | | 3 | 4 | | | | | 5 | 6 | 7 | | | 8 | | 9 | 10 | 11 | 12 | BLOCK CHANGES= 12 |
| BUFFER CHANGES | | 1 | | | | 2 | | | | | | | 3 | | | | | | 4 | | | | CALC EFFICIENCY |
| | | | | | | | | | | | | | | | | | | | | | | | (5-1) / 12 = 33% |
| | | | | | | | | | | | | | | | | | | | | | | | |
| | | | | | | | | | | | | | | | | | | | | | | | |
| BUFFER A | 1 | 1 | 1 | 1 | 1 | 1 | 1 | 1 | 1 | 1 | 1 | 1 | 1 | 1 | 1 | 1 | 1 | 1 | 1 | 1 | 1 | |
| BUFFER B | | 2 | 2 | 2 | 2 | 2 | 2 | 2 | 2 | 2 | 2 | 2 | 2 | 2 | 2 | 2 | 2 | 2 | 5 | 5 | 5 | |
| BUFFER C | | | | | | 3 | 3 | 3 | 3 | 3 | 3 | 3 | 3 | 3 | 3 | 3 | 3 | 3 | 3 | 3 | 3 | |
| BUFFER D | | | | | | | | | | | | | 4 | 4 | 4 | 4 | 4 | 4 | 4 | 4 | 4 | (5-1) / 4 = 100% WITH BUFFERS 4 |

FIG. 3B

|  |  |  | *---BLOCK---* | | | PBC | 100 MRB | *----MAX ROW/BLK EFFICIENCY RATES WITH BUFFERS----* | | | | | | | | | | | | | |
|---|---|---|---|---|---|---|---|---|---|---|---|---|---|---|---|---|---|---|---|---|---|
| GROUP | ROWS | BLOCKS | MAX | MIN | AVG | BLOCK | BLOCK EFF | 2 | 4 | 8 | 12 | 16 | 20 | 24 | 28 | 32 | 48 | 64 | 96 | 128 | 256 |
| REO REOK1 | READ | W/DATA | ROWS | ROWS | ROWS | CHANGES | % | % | % | % | % | % | % | % | % | % | % | % | % | % | % |
| 1 | 3,600 | 365 | 26 | 1 | 10 | 720 | 14 |  |  |  |  |  |  |  |  |  |  |  |  | 17 | 19 |
| 2 | 3,600 | 387 | 30 | 1 | 9 | 857 | 12 |  |  |  |  |  |  |  |  |  |  |  |  | 13 | 15 |
| 3 | 3,600 | 448 | 36 | 1 | 8 | 724 | 14 |  |  |  |  |  |  |  |  |  |  |  |  |  | 18 |
| 4 | 3,600 | 442 | 36 | 1 | 8 | 677 | 15 |  |  |  |  |  |  |  |  |  |  |  |  |  | 19 |
| 5 | 3,600 | 711 | 16 | 1 | 5 | 872 | 11 |  |  |  |  |  |  |  |  |  |  |  |  |  | 14 |
| 6 | 3,600 | 602 | 24 | 1 | 6 | 867 | 11 |  |  |  | 12 |  |  |  |  |  |  |  |  |  |  |
| 7 | 3,600 | 545 | 28 | 1 | 7 | 780 | 13 |  |  |  |  |  |  |  |  |  | 12 |  |  |  |  |
| 8 | 3,600 | 642 | 34 | 1 | 6 | 833 | 12 |  |  |  |  |  |  |  |  |  |  | 14 | 15 | 16 | 13 |
| 9 | 3,150 | 557 | 33 | 1 | 6 | 601 | 15 |  |  |  |  |  |  |  |  |  |  |  |  |  | 22 |

FULL TABLE

| | ROWS | BLOCKS | MAX ROWS | MIN ROWS | AVG ROWS | BLOCK CHANGES | BLOCK EFF | | | | | | | | | | | | | 128 | 256 |
|---|---|---|---|---|---|---|---|---|---|---|---|---|---|---|---|---|---|---|---|---|---|
| MRB | 31,950 | 888 | 36 | 18 | 36 | 6,931 | 13 |  |  |  |  |  |  |  |  |  |  |  |  | 14 | 16 |
| AMRB | 31,950 | 888 | 36 | 18 | 36 | 6,931 | 13 |  |  |  |  |  |  |  |  |  |  |  |  | 14 | 16 |

FIG. 4

| GROUP REO REOK1 | ROWS READ | BLOCKS W/DATA | BLOCK MAX ROWS | BLOCK MIN ROWS | BLOCK AVG ROWS | PBC 100 MRB CHANGES | MRB BLOCK EFF % | 2% | 4% | 8% | 12% | 16% | 20% | 24% | 28% | 32% | 48% | 64% | 96% | 128% | 256% |
|---|---|---|---|---|---|---|---|---|---|---|---|---|---|---|---|---|---|---|---|---|---|
| 1 | 3,600 | 735 | 19 | 1 | 5 | 1,184 | 8 | | | | | | | | | | | | | | |
| 2 | 3,600 | 694 | 21 | 1 | 5 | 1,138 | 9 | | | | | | | | | | | | 9 | 11 | |
| 3 | 3,600 | 749 | 32 | 1 | 5 | 816 | 12 | | | | | | | | | | | | | | 14 |
| 4 | 3,600 | 504 | 19 | 1 | 7 | 503 | 20 | | | | | | | | | | | | | | |
| 5 | 3,600 | 476 | 25 | 2 | 8 | 475 | 21 | | | | | | | | | | | 21 | 22 | 24 | 32 |
| 6 | 3,600 | 204 | 23 | 1 | 18 | 203 | 50 | | | | | | | | | | | | | | |
| 7 | 3,600 | 201 | 28 | 5 | 18 | 200 | 51 | | | | | | | | | | | | | | |
| 8 | 3,600 | 195 | 36 | 8 | 18 | 194 | 53 | | | | | | | | | | | | | | |
| 9 | 3,600 | 203 | 27 | 6 | 18 | 202 | 50 | | | | | | | | | | | | | | |
| 10 | 37 | 3 | 18 | | 12 | 2 | 50 | | | | | | | | | | | | | | |
| FULL TABLE | | | | | | | | | | | | | | | | | | | | | |
| MRB | 32,437 | 1,796 | 36 | 1 | 18 | 4,917 | 18 | | | | | | | | | | 19 | | 37 | | 21 |
| AMRB | 32,437 | 1,796 | 36 | 1 | 18 | 4,917 | 36 | | | | | | | | | | | | 37 | 38 | 42 |

402 ↗ (REO REOK1 header)
404 ↗ (group rows)
406 ↗ (FULL TABLE section)

FIG. 4A

| GROUP REO REOK1 | ROWS READ | BLOCKS W/DATA | *...BLOCK...* MAX ROWS | MIN ROWS | AVG ROWS | PBC CHANGES | 100 MRB BLOCK EFF % | *...MAX ROW/BLK EFFICIENCY RATES WITH BUFFERS...* 2% 4% 8% 12% 16% 20% 24% 28% 32% 48% 64% 96% 128% 256% |
|---|---|---|---|---|---|---|---|---|
| 1 | 3,600 | 100 | 36 | 36 | 36 | | 100 | |
| 2 | 3,600 | 100 | 36 | 36 | 36 | | 100 | |
| 3 | 3,600 | 100 | 36 | 36 | 36 | | 100 | |
| 4 | 3,600 | 100 | 36 | 36 | 36 | | 100 | |
| 5 | 3,600 | 100 | 36 | 36 | 36 | | 100 | |
| 6 | 3,600 | 100 | 36 | 36 | 36 | | 100 | |
| 7 | 3,600 | 100 | 36 | 36 | 36 | | 100 | |
| 8 | 3,600 | 100 | 36 | 36 | 36 | | 100 | |
| 9 | 3,600 | 100 | 36 | 36 | 36 | | 100 | |
| 10 | 37 | 2 | 36 | 1 | 19 | | 2 50 | |

402 → (GROUP column)
404 → (data rows)

FULL TABLE
| | | | | | | | | |
|---|---|---|---|---|---|---|---|---|
| MRB | 32,437 | 902 | 36 | 1 | 36 | | 902 100 | |
| AMRB | 32,437 | 902 | 36 | 1 | 36 | | 902 100 | |

406 → (FULL TABLE)

FIG. 5

SYSTEM AND METHOD FOR AUTOMATED ONLINE REORGANIZATION OF SEQUENTIAL ACCESS DATABASES

TECHNICAL FIELD

The invention relates to the field of relational database systems and products. More particularly, the invention relates to determining sequential access efficiency for relational database tables and automatically reorganizing the tables based on the determined efficiency.

BACKGROUND

Relational database management systems provide data row storage options that allow data row storage to be varied from a selected native key sequence. Various data storage options may be utilized, for example, "clustered" (which attempts to place the data rows in native key sequence but allows some deviation if space becomes a concern), "sequential" (which places new data rows at the end of the existing space and when space is exhausted, wraps back to the front of a table and begins adding data rows there), "random" (which places data rows wherever there is available space). The "random" option is most commonly used because it consumes the least amount of resources.

For most indexed access of data rows, the actual data row order in the table has no effect on the performance of the database or the accessing application. However, various applications require access to large segments of data rows using a sequential (read next) process. In these cases, the native key sequence may be selected to access the data rows.

Over a period of time with additions and deletions of data rows from the database table, the data row sequence becomes disorganized. When this disorganization occurs, the application accessing the data rows according to native key sequence slows because the database management system is required to perform substantially more physical IOs to retrieve the data rows in the native key sequence.

In order to re-order the data rows according to the native key sequence, database reorganization processes may be regularly scheduled. However, database reorganizations may be resource-intensive and in some cases unnecessary. In these cases, database resources may be wasted when reorganizing database tables that do not need reorganization. Furthermore, when reorganizations are necessary, oftentimes such reorganizations are not performed due to inaction by system administrators for various reasons. Thus, what is needed is a low cost (resource-wise) way to determine whether at least a portion of a sequential-access database will benefit from reorganization. What is also needed is an ability to specify when the database table should be reorganized and a level of reorganization that should take place. What is further needed is an ability to automatically initiate reorganization of the table when it is determined that the table should be reorganized.

These and other drawbacks exist.

SUMMARY

Various systems, computer program products, and methods for reorganizing data records of a database are described herein. For example, a method may include various operations such as receiving an efficiency parameter that indicates a satisfactory level of organizational efficiency of at least a portion of a database table having a group of rows stored using a plurality of data blocks. In some implementations, a level of organizational efficiency is based on a number of data block changes that occur while sequentially accessing the database table. In some implementations, a data block change occurs when a current row is stored in a first data block and a next row is stored in a second data block that is different from the first data block such that accessing the next row after accessing the current row results in the data block change. In some implementations, the operations may further include determining a number of data block changes that occur during a sequential access of the group of rows. In some implementations, the operations may include determining an efficiency associated with the group of rows based on the determined number of data block changes that occur during the sequential access of the group of rows. In some implementations, the operations may include comparing the determined efficiency and the efficiency parameter. In some implementations, the operations may include determining whether the determined efficiency is satisfactory based on the comparison. In some implementations, the operations may include generating a control card to reorganize the group of rows when the efficiency is not satisfactory, the control card causing a reorganization of the group of rows.

BRIEF DESCRIPTION OF THE DRAWINGS

The accompanying drawings, which are incorporated into and constitute a part of this specification, illustrate one or more examples of implementations of the invention and, together with the description, serve to explain various principles and aspects of the invention.

FIGS. 2A and 2B illustrate exemplary charts depicting sequential access efficiency, according to various aspects of the invention.

FIGS. 3A and 3B illustrate exemplary charts depicting buffered sequential access efficiency, according to various aspects of the invention.

FIGS. 4, 4A and 5 illustrate exemplary reports generated by a database management system, according to various aspects of the invention.

Reference will now be made in detail to various implementations of the invention as illustrated in the accompanying drawings. The same reference indicators will be used throughout the drawings and the following description to refer to the same or like items.

DESCRIPTION OF EXEMPLARY IMPLEMENTATIONS

Figure 1:
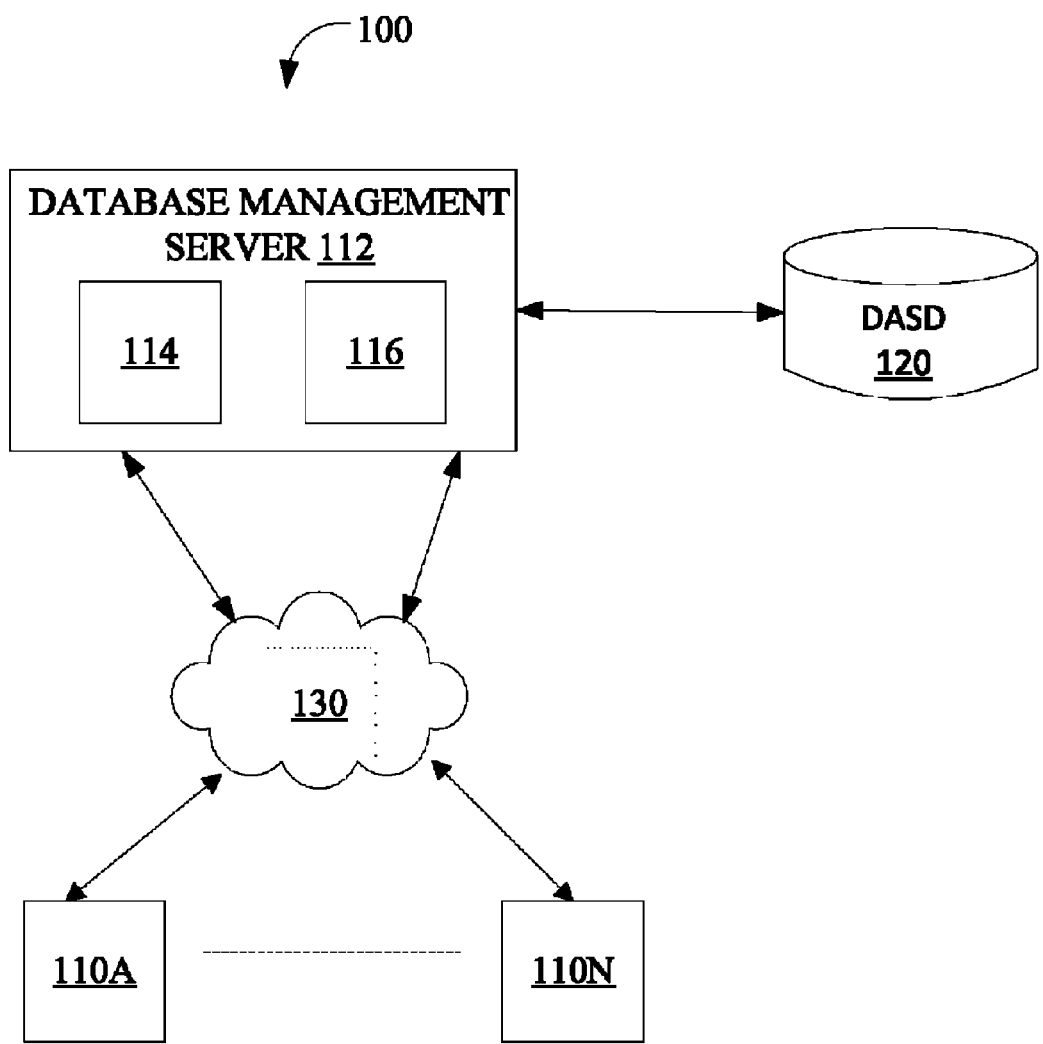
FIG. 1 illustrates an exemplary database management system, according to various aspects of the invention.

FIG. 1 is an exemplary illustration of a database management system 100, according to an aspect of the invention. Database management system 100 may include, among other things, at least a database management server 112 that is configured to manage one or more relational databases and/or indexes for the relational databases. In some implementations, a database table may include one or more groups of rows. Each group of rows may include one or more rows that are organized according to a native key sequence. When the rows become disorganized due to various updates, additions, and/or deletions to the database table, sequential access efficiency decreases, thereby decreasing database performance. In some implementations, database management system ("DBMS") 100 may be used to identify a group of rows that becomes disorganized and automatically reorganize the disorganized group.

In some implementations, DBMS 100 may use an efficiency parameter that indicates a satisfactory level of efficiency. For example, a database administrator or other user/entity/computer may determine that a particular level of efficiency should be maintained for a group of rows of a database table such that whenever a group of rows falls below the desired level of efficiency, an online reorganization of the identified group of rows is automatically initiated.

In some implementations, the efficiency parameter may be received with a request, in response to which DBMS 100 may generate a report that indicates levels of sequential access efficiency for various groups of rows of a database table and identifies which groups have efficiencies that fall below the level indicated by the efficiency parameter. For example, a database administrator or others may execute a command that causes an efficiency of groups of rows to be automatically determined. In these implementations, in addition to or instead of generating the report, DBMS 100 may automatically reorganize any group of rows that falls below the level of efficiency indicated by the efficiency parameter.

In some implementations, DBMS 100 may use a refgroup parameter that indicates the size (in number of rows) of the group of rows that will be processed (as a group) by the online reorganization. Online reorganization may reorder data rows within the group to improve the sequence of the data rows according to the native sequence key and thereby improve the performance of the sequential data row access. Smaller refgroup values provide a smaller group of rows to be processed as a group which uses more computational resources but results in a higher level of data row efficiency gain. Larger refgroup values provide larger groups of rows to be processed as a group and therefore reduce computational resources to reorder the rows, but will also result in a reduced gain in efficiency. For example, a refgroup parameter setting of "0" may indicate that 100% efficiency (described in more detail below) should be achieved by reordering data rows according to the native sequence key in order to achieve an efficiency of 100%. Achieving this highest level of efficiency may consume more computational resources than using a non-zero refgroup value. In some cases, a lower rate of efficiency may be acceptable for the processing and would consume lesser computational resources. In some implementations, a database administrator or others may specify, using the refgroup parameter, a desired level of efficiency to be achieved balanced by practical requirements.

For example, while an efficiency of 100% may be optimal from an efficiency standpoint, achieving such efficiency may take too many computational resources when an efficiency of 70% may be adequately efficient. In some instances, a group of rows already at 70% efficiency may be adequately efficient so that reorganizing the group to achieve 100% efficiency may unnecessarily consume computational resources. A group of rows at 30% efficiency may be made sufficiently efficient by reorganizing to 70% efficiency instead of 100% efficiency in order to save computational resources.

In some implementations, DBMS 100 may automatically reorganize one or more groups of rows (or all) of the database table by minimizing the number of blocks used by the rows of the database table. In some implementations, DBMS 100 may determine target blocks, which are blocks storing a number of rows that exceed a target number of rows and have available freespace. DBMS 100 may determine source blocks, which are blocks with at least one row in this reference group and not in the target block list. DBMS 100 may then sort the source blocks by least number of reference group rows to largest and sort the target blocks by the most amount of rows to the least amount of rows. DBMS 100 may then move the rows from the "least" source blocks to freespace on the "most" target block. Once that target block is full, DBMS 100 identifies the next target block with the most rows and available freespace and continues the movement of rows from the "least" source blocks. DBMS 100 may continue the process until there are no more rows for this reference group in the source blocks or the freespace on the target blocks has been expended. Of course, based on a profile or a user request (for example), DBMS 100 may also generate a detail line for each reference group showing records moved and, individually or in combination, generate summary report. In this manner, DBMS 100 may reorganize a group of rows so that a smaller number of blocks are used to store the group of rows. As would be appreciated, the foregoing is for illustration purposes only and any reorganization technique operable to use reorganize rows of data to minimize block usage may be utilized.

In some implementations, by automatically identifying groups of rows that should be reorganized and automatically causing reorganization of such groups, DBMS 100 may allow a database administrator or others to maintain a desired level of efficiency for groups of rows of a database table with minimal manual intervention.

Database management server 112 may be communicatively coupled to one or more data storage access devices (DASD) 120 that may store/maintain one or more database tables associated with relational database(s), store/maintain one or more indexes for the tables in the database(s), and/or other data structures. In some implementations, database management server 112 may be communicatively coupled to a client device 110 (illustrated in FIG. 1 as a plurality of client devices 110A, . . . , 110N). Database management server 112 may be coupled to client device 110 via a network 130. Network 130 may include a Local Area Network, a Wide Area Network, a cellular communications network, a Public Switched Telephone Network, and/or other network or combination of networks.

In some implementations, database management server 112 may include a processor 114, a memory 116, and/or other components that facilitate the functions of database management server 112. In some implementations, processor 114 includes one or more processors configured to perform various functions of database management server 112. In some implementations, memory 116 includes one or more tangible (i.e., non-transitory) computer readable media. Memory 116 may include one or more instructions that when executed by processor 114 configure processor 114 to perform functions of database management server 112. In some implementations, memory 116 may include one or more instructions stored on tangible computer readable media that when executed at a remote device, such as client device 110, cause the remote device to display at least one report, as described herein.

Database administrators (or other users) may interact with the database management server 112 via client device 110. In some implementations, client device 110 may include a computing/processing device such as a desktop computer, a laptop computer, a network computer, a wireless phone, a personal digital assistant, a tablet computing device, workstation, and/or other computing devices that may be utilized to interact with database management server 112. In some implementations, client device 110 may comprise a user interface (not otherwise illustrated in FIG. 1) that may enable users to perform various operations that may facilitate interaction with database management server 112 including, for example, providing requests to retrieve information from database tables, create tables, add/delete/update rows/columns in database tables, create/delete/update/access one or more indexes associated with the database tables, providing requests for determining sequential access efficiency for database tables, providing requests to generate one or more reports associated with the database tables, receiving one or more reports associated with the database tables and displaying the reports, providing an efficiency parameter that indicates a satisfactory level of organizational efficiency, providing a refgroup parameter that indicates a level of organizational efficiency to be achieved, and/or performing other operations. Client device 110 may include a processor (not otherwise illustrated in FIG. 1), circuitry, and/or other hardware operable to execute computer-readable instructions.

In some implementations, database management server 112 may manage various operations performed on the relational database(s) stored in DASD 120 and/or one or more database tables in the relational database(s). For example, database management server 112 may receive requests (for example, user requests, and/or other requests) to create table(s), add row(s)/column(s), delete row(s)/column(s), update row(s)/column(s), retrieve information from row(s)/column(s), and/or other requests. Database management server 112 may convert the requests to queries that may be run against the relational database(s) and may accordingly create one or more tables in the database(s), add one or more rows/columns to the tables in database, delete one or more rows/columns from the tables in database, update one or more rows/columns in the tables in database, retrieve requested information from the tables in database, and/or perform other operations. In order to retrieve requested information from the database, database management server 112 may access one or more tables specified by the query (and/or request) to determine the information within the tables that matches a given request criteria specified in the query. Database management server 112 may then retrieve the determined information from the tables and provide it to the user.

In some implementations, database management server 112 may manage creation, deletion, updating, access, and/or other operations associated with one or more indexes for the tables in the relational database(s). Database management server 112 may create one or more indexes on one or more columns of one or more tables. An index entry may refer to one entry or index value that is in the index and references a given data row(s) of the database table. An index entry may consist of the value(s) contained in the column(s) being indexed for a given data row, and a pointer to the data row. The data row pointer may consist of a data block number/id within which the data row resides, and the unique row id. Most access requests within the relational database environment are based on index access. Index access typically refers to the pre-definition of a specific access path that is created using the value(s) of data column(s). Once created, the database can quickly retrieve data rows that have an index entry (data column value) that matches a given request criteria. In some implementations, the indices may be stored in a physical area in the DASD 120.

When a data row is added to an indexed table, database management server 112 may create an index entry in the index associated with the indexed table using the data value of the indexed column(s). Similarly, when a data row is deleted from or updated in an indexed table, database management server 112 may delete the appropriate index entry from the index or update the appropriate index entry in the index (for example, if the indexed column data value is changed/updated). When a request to retrieve particular information from a table in a database is received by database management server 112 (for example, in the form of search queries specifying an indexed column), database management server 112 may perform an index access to determine one or more index entries that include data values associated with the indexed column and/or that satisfy the request. Database management server 112 may identify data row pointers from the determined index entries that identify or serve as pointers to a specific data row(s) stored in DASD 120. Database management server 112 may accordingly retrieve one or more data rows associated with the data row pointers from DASD 120.

In some implementations, data rows in the tables may be accessed using a specific index value ("key"). Data rows may be indexed according to one or more keys, allowing rows to be accessed using one or more index paths. The order of keys in a particular index may be referred to as a "key sequence" for that particular index. One of these indices may be selected to correspond to the physical storage order of the data rows in order to facilitate retrieval from DASD 120. Such an index may be referred to as a "native key sequence" and may be used when the entire content of the database or some portion thereof is accessed in a sequential process.

In some implementations, database management server 112 may manage the placement/storage of a plurality of data rows in a physical data area in the DASD 120. The physical data area may be separate from where the indices are stored. The plurality of data rows may be stored using a plurality of data blocks (i.e., physical blocks in DASD 120).

In some implementations, database management server 112 may store an initial set of data rows according to the native key sequence. As data rows are added, deleted, and/or updated by database management server 112 and/or data blocks in DASD 120 are reused, the order of data rows in DASD 120 (i.e., data row sequence) may become disorganized. In other words, the data rows may no longer be stored according to the native key sequence (i.e., the data rows may no longer be stored in the same order as the native key sequence). This disorganization may adversely affect applications running on database management server 112 that require batch processing of rows (for example, online billing applications, catalog creating applications, and/or other applications). These applications may require at least a portion of the database table to be accessed using a sequential (read next) process. In these cases, the native key sequence may be selected to access the data rows. When disorganization of the data row sequence occurs, accessing according to the native key sequence slows because the database management server 112 may be required to perform substantially more accesses to the physical data blocks (i.e., physical IOs) to retrieve data rows in the native key sequence from the data blocks.

In some implementations, database management server 112 may receive a user request (or other request) to determine a sequential access efficiency for a database table. In some implementations, the request may include one or more parameters identifying the database table for which the sequential access efficiency is to be determined, a native key sequence for the database table, reference group size, and/or other parameters. In some implementations, the sequential access efficiency may indicate how close the data row sequence associated with a selection of rows is to the native key sequence when the selection of rows is read in sequential order.

In some implementations, database management server 112 may determine a sequential access of a plurality of rows of a database table, wherein the sequential access occurs when at least a portion of the database table is accessed. In some implementations, database management server 112 may determine the sequential access in response to the request. In some implementations, determining a sequential access may include determining a sequential access while the database is online. In some implementations, determining a sequential access may include determining a sequential access while the database is offline. In some implementations, determining a sequential access may include accessing the plurality of rows of the database table sequentially according to the native key sequence. In some implementations, determining a sequential access efficiency may include using a buffer pool managed by a least recently used (LRU) algorithm to determine how the data blocks stored in a plurality of data buffers may improve the sequential access efficiency.

In some implementations, database management server 112 may determine a number of data block changes that occur during the sequential access of the plurality of rows in the database table. In some implementations, database management server 112 may determine the number of data block changes in response to the request. In some implementations, a data block change may occur when a current data row is stored in a first data block and a next row is stored in a second data block that is different from the first data block such that accessing the next row after accessing the current row results in the data block change. In other words, a data block change may refer to the change that occurs when a next data row (accessed according to the native key sequence) is on a data block which is not the same data block that a current data row is on. In some implementations, determining a number of data block changes may include determining a number of times a data block change occurs during a sequential pass (ascending) of the index values associated with the native key sequence.

In some implementations, database management server 112 may determine a sequential access efficiency based on the determined number of data block changes. In some implementations, database management server 112 may determine the sequential access efficiency in response to the request. In some implementations, the sequential access efficiency for the database table may be based on a determined number of data block changes and a number of data blocks that contain data. In some implementations, database management server 112 may determine the number of data blocks that contain data, as illustrated in more detail with respect to FIG. 2.

In some implementations, the request to determine a sequential access efficiency may include an efficiency parameter that indicates a satisfactory level of efficiency. The level of efficiency may be expressed as a percentage (e.g., 70% efficiency), a ratio (e.g., 0.7 efficiency), or other representation that can convey a level of efficiency. In these implementations, when the sequential access efficiency for a group of rows (or the database table) falls below the level of efficiency indicated by the efficiency parameter, database management server 112 may automatically initiate an online reorganization of the group of rows.

In some implementations, database management server 112 may automatically initiate the online reorganization by generating a control card, which may be received by an online reorganization process, such as a reorganization process described above, of database management server 112. In some implementations, the control card identifies a group of rows to be reorganized such that the online reorganization process automatically reorganizes the identified group.

In some implementations, the control card may specify various parameters such as, for example, a table name, a database identifier, a reference group ("refgroup") parameter, a first key, and a last key.

A format of a control card is illustrated below, although other formats may be used as would be appreciated.

OLREORG TABLE=ttt, DBID=dbid, REFGROUP=rg
FIRSTKEY=lnfffffffffffffffffffffffffffffffffffffffffffffff
ffffffffff,
LASTKEY=lnllllllllllllllllllllllllllllllllllllllllllllllllllllllllll, where "ttt" is a table name, "dbid" is a database identifier, "rg" is refgroup parameter that includes a two digit number (or other value), lnfff . . . fff is a two digit length followed by the first 60 (or other) bytes of the first key value, and lnlll . . . lll is a two digit length followed by the first 60 (or other) bytes of the last key value. In this format, a group of rows is indicated based on its first key and its last key. In some implementations, the first and last key values are stored as hex values.

In some implementations, in an ordered database table, the number of data block changes when processing/accessing all of the data rows by native key sequence equals the number of data blocks with at least one data row in them minus one (minus 1). FIG. 2A illustrates an exemplary chart depicting sequential access efficiency for an ordered database table. The data rows are in native key sequence order in the data blocks and there are five data blocks in use (i.e. 5 data blocks that contain data). Rows 1-5 are in data block 1, rows 6-10 are in data block 2, rows 11-15 are in data block 3, rows 16-20 are in data block 4, and row 21 is in data block 5. Sequential processing/accessing of these data rows (according to native key sequence) would result in 4 data block changes because each data block would be accessed once, and all data rows would be retrieved on that data block before moving to the next data block. For example, as depicted in FIG. 2A, a first block change occurs after rows 1-5 have been accessed (i.e. change from data block 1 to data block 2), a second block change occurs after rows 6-10 have been accessed (i.e. change from data block 2 to data block 3), a third block change occurs after rows 11-15 have been accessed (i.e. change from data block 3 to data block 4), and a fourth block change occurs after rows 16-20 have been accessed (i.e. change from data block 4 to data block 5).

In some implementations, the sequential access efficiency may be determined by the following equation:

$$(N_B-1)/N_C \quad (1),$$

where $N_B$ represents the number of blocks with data and $N_C$ represents the number of block changes that occurred or will occur during sequential access of the data rows.

Thus, the database table of FIG. 2A is determined to have a 100% sequential access efficiency because (5−1)/4=100%.

FIG. 2B illustrates an exemplary chart depicting sequential access efficiency for an unordered database table (i.e., the data rows are not in native sequence order in the data blocks). Row 1 is in data block 1, row 2 is in data block 2, rows 3-5 are in data block 1, row 6 is in data block 3, rows 7-10 are in data block 2, row 11 is in data block 1, row 12 is in data block 3, rows 13-15 are in data block 4, rows 16-17 are in data block 3, row 18 is in data block 4, row 19 is in data block 5, row 20 is in data block 4, and row 21 is in data block 3. Sequential processing/accessing of these data rows would result in 12 data block changes which means that on average each data block would be accessed three times in order to process/access the data rows according to the native sequence order.

For example, as depicted in FIG. 2B, a first block change occurs after row 1 has been accessed (i.e. change from data block 1 to data block 2), a second block change occurs after row 2 has been accessed (i.e. change from data block 2 back to data block 1), a third block change occurs after rows 3-5 have been accessed (i.e. change from data block 1 to data block 3), a fourth block change occurs after row 6 has been accessed (i.e. change from data block 3 to data block 2), a fifth block change occurs after rows 7-10 have been accessed (i.e., change from data block 2 to data block 1), a sixth block change occurs after row 11 has been accessed (i.e., change from data block 1 to data block 3), a seventh block change occurs after row 12 has been accessed (i.e. change from data block 3 to data block 4), an eighth block change occurs after rows 13-15 have been accessed (i.e., change from data block 4 to data block 3), a ninth block change occurs after rows 16-17 have been accessed (i.e., change from data block 3 to data block 4), a tenth block change occurs after row 18 has been accessed (i.e., change from data block 4 to data block 5), an eleventh block change occurs after row 19 has been accessed (i.e., change from data block 5 to data block 4), and a twelfth block change occurs after row 20 has been accessed (i.e., change from data block 4 to data block 3).

Based on equation 1 above, the database table of FIG. 2B is determined to have a 33% sequential access efficiency because (5−1)/12=33%.

When the sequential access efficiency for the database table is low, sequential access of the database table is likely to take more physical IOs than when the sequential access efficiency is high for the same data. This is because each block change may require physical IOs for processing. Therefore, more CPU consumption is required to complete the sequential access when the sequential access efficiency is low than when the sequential access efficiency is high. Lower physical processing results in lower CPU consumption and lower elapsed times. Accordingly, when sequential access efficiency is low, a data reorganization may be helpful. On the other hand, when sequential access efficiency is high, a data reorganization may be unnecessary. As would be appreciated, "high" and "low" efficiency may be relative and can be defined according to particular needs.

In some implementations, database management server 112 may utilize large buffer pools (for example, in memory 116) for storing one or more data blocks as they are accessed/read such that the data blocks may be accessed multiple times as long as they remain in the buffers. Applications/tasks running on database management server 112 may have a number of data buffers associated with the tasks. Associating a number of buffers to a given application/task may improve efficiency and reduce the number of times a data block will need to be retrieved/accessed during sequential processing. In other words, using buffers may reduce physical IO required for a block change. For example, when data block 1 is accessed and placed in a buffer, returning back to data block 1 to retrieve a row may not result in a physical IO in response to the block change because data block 1 is still available in memory (buffer), thus reducing the impact or cost of the data block change.

In some implementations, database management server 112 may determine a buffered sequential access efficiency for the database table based on a number of available buffers. In some implementations, database management server 112 may determine a buffered sequential access of a plurality of rows of a database table based on a number of buffers used to buffer the buffered sequential access. In some implementations, determining a buffered sequential access may include accessing the plurality of rows of the database table sequentially according to the native key sequence and determining utilizing a set number of buffers. In some implementations, database management server 112 may determine a number of block changes that occur during the buffered sequential access.

For example, if data rows have been sequentially accessed and those rows resided in four sequentially arranged data blocks (i.e., blocks 1, 2, 3, and 4) and there are 2 buffers (Buffers A and B) being managed by a LRU (Least Recently Used) algorithm, blocks 3 and 4 would be maintained in buffers A and B, respectively. In other words, blocks 3 and 4 would be maintained in memory 116. The last data row accessed was in block 4. If the next data row to be accessed is in block 3, a data block change would occur but not be counted as a block change because block 3 is still in memory (in Buffer A, for example). However, if the next data row to be accessed is in block 2, a data block change would occur and be counted since block 2 is not in a buffer (in memory) and a physical IO would be needed to retrieve block 2 from DASD 120. In a LRU managed buffer pool, the access of block 2 would load block 2 into the oldest buffer (i.e. Least Recently Used). In some implementations, the block change count may be significantly lower for a buffered sequential access. As such, when a number of buffers are available for a task, a data block change is not counted if a new block number that is being accessed would have been in a buffer associated with the task.

As would be appreciated, a particular buffer may store different numbers of data blocks. Furthermore, LRU managed buffer pools are described for illustrative purposes and not limitation. Other types of buffer pools (memory) may be used.

FIG. 3A illustrates an exemplary chart depicting buffered sequential access efficiency for the database table depicted in FIG. 2B with two buffers. In some implementations, the buffers may be managed by a LRU (least recently used) algorithm. As illustrated in FIG. 3A, even though there still are 12 logical data block changes, database management server 112 accesses the data blocks only 8 times (depicted as buffer changes in FIG. 3A). In other words, instead of 12 data block changes, there are eight data block changes with two buffers because one or more data blocks do not have to be retrieved from DASD 120 every time there is a data block change. As such, based on equation (1) above, the database table of FIG. 3A with two buffers is determined to have a 50% buffered sequential access efficiency because (5−1)/8=50%, which is an improvement over the sequential access efficiency of 33%.

FIG. 3B illustrates an exemplary chart depicting buffered sequential access efficiency for the database table depicted in FIG. 2B with four buffers. In some implementations, the buffers may be managed by a LRU (least recently used) algorithm. As illustrated in FIG. 3B, even though there still are 12 logical data block changes, database management server 112 accesses the data blocks only 4 times (depicted as buffer changes in FIG. 3B). In other words, instead of 12 data block changes, there are four data block changes with four buffers. As such, based on equation (1) above, the database table of FIG. 3B with four buffers is determined to have a 100% buffered sequential access efficiency because (5−1)/4=100%.

In some implementations, database management server 112 may generate one or more reports. In some implementations, database management server 112 may generate the report(s) in response to the request. A report, among other things, may include the determined sequential access efficiency for the database table, and the determined buffered sequential access efficiency for the database table utilizing one or more numbers of buffers (for example, buffered sequential access efficiency with 2 buffers, 4 buffers, 8 buffers, and so on).

FIG. 4 depicts an exemplary report generated by database management server 112, according to various aspects of the invention. FIG. 4 and other figures illustrating an example of a report is for illustrative purposes only and should not be viewed as limiting. The report may include various formats and configurations while including or excluding some header items and values illustrated and adding other header items and values not otherwise illustrated in the figure as would be appreciated.

In some implementations, the report may have three sections 402, 404, and 406. Section 402 may describe the report header that provides information about the database table being processed. "REO" may indicate the name of the database table being processed. "REOK1" may indicate the name of the native key sequence for the database table. "GROUP" may indicate a particular reference group being processed. In some implementations, a reference group may include a group of rows. "ROWS READ" may indicate the number of rows in the particular reference group. "BLOCKS WITH DATA" may indicate a number of data blocks that have at least one data row from the particular reference group. "MAX ROWS" may indicate a maximum number of rows found on any data block in the particular reference group. "MIN ROWS" may indicate a minimum number of rows found on any data block in the particular reference group. "AVERAGE ROWS" may indicate an average number of rows per data block. "BLOCK CHANGES" may indicate an actual number of block changes that occurred when processing the data rows in the particular reference group in sequential order (i.e., according to native key sequence"). "MRB (maximum rows per block) efficiency" may indicate the sequential access efficiency for the particular reference group. "MRB (Maximum row per block) efficiency rates with buffers" may indicate the buffered sequential access efficiency for the particular reference group. "PBC" may indicate a perfect block count for a particular reference group. In some implementations, PBC may indicate a data block change number that would give 100% sequential access efficiency. In some implementations, as the data rows in the reference groups are processed, the actual number of data block changes that occur is compared against the PBC to determine the sequential access efficiency.

In some implementations, section 404 may provide detailed information regarding each reference group associated with the database table. As illustrated in FIG. 4, the total number of rows (indicated as 31,960 in section 406) in the database table is divided into 9 reference groups. Reference groups 1-8 each have 3,600 rows per group and reference group 9 has 3,150 rows.

In some implementations, a reference group may be defined as a grouping of rows where the rows are included in the reference group according to their native sequence key value. In these implementations, the reference group is not a grouping by physical location but rather a grouping by logical order according to the native sequence key. Referring to FIG. 4, for example, reference group 1 may include the first 3,600 rows in the database table according to native key value (ascending). Reference group 2 may have the next 3,600 rows according to native sequence key, and so on. Since the reference group is a logical grouping, the data rows in the groups may be spread across many physical data blocks. For a data block to be part of the reference group it will have at least 1 row from the reference group on the data block. In some implementations, a given physical data block may contain rows from many different reference groups.

In some implementations, the sequential efficiency may be determined for each reference group processed. This may be relevant in database implementations where reorganization processes can be focused on a specific portion of the database table. In these implementations, having the information on each reference group may indicate that only part of the table should be reorganized. In some implementations, the sequential efficiency rating may be produced for the entire table (without respect to reference groups).

Reference group 1, for example, has 3,600 rows and 365 data blocks with at least one data row in them. The maximum number of rows found on any data block in reference group 1 is 26. The minimum number of rows found on any data block in reference group 1 is 1. The average number of rows per data block in reference group 1 is 10. The number of block changes that occurred when processing the data rows in reference group 1 in sequential order (i.e., according to native key sequence) is 720. In some implementations, the number 720 represents the actual number of data block changes that occurred when the data rows are processed.

In some implementations, the actual number of data block changes may be compared against PBC (perfect block count) to determine the sequential access efficiency. In some implementations, database management server 112 may determine PBC based on the following equation:

$$(N_R/N_{Max})-1 \quad (2),$$

Where $N_R$ represents a number of rows per reference group and $N_{Max}$ represents a maximum number of rows that will fit on a data block.

In some implementations, database management server 112 may determine/calculate the maximum number of rows that will fit on a data block. For the reference groups of FIG. 4, the maximum number of rows that will fit on a data block (MRB) may be determined as 36, for example. In some implementations the maximum rows per block for a fixed length data row (not compressed) may be calculated by determining the number of data rows that could fit into the data block. In some implementations, this calculation may be based on the following equation:

$$(MRB=ABS/RL) \quad (3),$$

where ABS represents the size of the data block minus any bytes used for block management and RL represents the stored length of the data row including any bytes that the database management system adds onto the row for management purposes. The calculated MRB value may be rounded to a whole number. Thus, for reference group 1, for example, the number of data blocks (if filled to maximum number of rows which is MRB=36) that would hold 3,600 rows would be 3,600/36=100. In some implementations, the maximum rows per block for a variable length data row (usually compressed) may be determined by physically scanning a set of data blocks and determining the number of data rows that are actually on the data block. The block with the highest data row content may be used as the value for MRB.

In some implementations, PBC is determined to be RGR/MRB. Where RGR is the number of rows in the reference group, MRB is the maximum rows per block. Referring to FIG. 4, for reference groups 1-8 PBC=3600/36=100 (depicted as PBC 100 in section 402). Referring to FIG. 4, reference group 9 encompasses the remaining data rows at the high end of the index and therefore may not be a full size reference group. For this last reference group the PBC is calculated as PBC=3150/36=88. In these implementations, PBC may indicate a data block change number that would give 100% sequential access efficiency. This means that assuming that the data rows in a reference group 1-8 are arranged according to native key sequence, to read/process the 3,600 data rows on 100 data blocks in each reference group, 100 block changes would be required. This means that assuming that the data rows in a reference group 9 are arranged according to native key sequence, to read/process the 3,150 data rows on 88 data blocks in each reference group, 88 block changes would be required.

In some implementations, the sequential access efficiency (MRB efficiency) for each reference group may be determined. In some implementations, database management server 112 may determine the sequential access efficiency based on the following equation:

$$PBC_R/N_{BC} \qquad (4),$$

where $PBC_R$ represents PBC per reference group and $N_{BC}$ represents an actual number of block changes per reference group.

Thus, for reference group 1, for example, the sequential access efficiency may be determined as 100/720=14%.

In some implementations, database management server 112 may determine the buffered sequential access efficiency (MRB efficiency with buffers) for each reference group. For reference group 1, for example, FIG. 4 depicts that the buffered sequential access efficiency with 128 buffers is 17%, with 256 buffers is 19%. In FIG. 4, the buffered sequential access efficiency values are only displayed if the determined value with buffers is higher that a previous entry for the reference group. It will be appreciated, however, that the buffered sequential access efficiency may be determined and displayed for all the other sets of buffers (2, 4, 8, 12, 16, 20, 24, 28, 32, 64, and 96) without departing from the spirit of the invention.

While the above paragraphs describe values and computations for reference group 1, similar computations may be performed for reference groups 2-9 and displayed in section 404, as depicted in FIG. 4.

In some implementations, section 406 may provide reference group information for the complete database table. For example, the database table is treated as a reference group that has 31,950 rows and 888 data blocks with at least one data row in them. In these implementations, this final reference group is not a summarization of the results of the previous reference groups. It is a separate analysis of the table as a single reference group where every row in the table is part of the reference group. The maximum number of rows found on any data block in the database table is 36. The minimum number of rows found on any data block in the database table is 18. The average number of rows per data block in the database table is 36. The actual number of block changes that occurred when processing the data rows in the database table in sequential order (i.e., according to native key sequence") is 6,931.

In some implementations, the sequential access efficiency for the database table may be determined. In some implementations, database management server 112 may determine the sequential access efficiency for the database table based on the following equation:

$$PBC_T/N_T \qquad (5),$$

Where $PBC_T$ represents PBC for the database table and $N_T$ represents actual number of block changes for the database table.

In some implementations, $PBC_T$ may be determined based on the following equation:

$$(N_r/R_{max})-1 \qquad (6),$$

Where Nr represents number of rows per database table and Rmax represents actual maximum rows per block.

Thus, the sequential access efficiency for the database table may be determined as (31,950/36)/6,931=13%.

In some implementations, database management server 112 may determine, while processing the entire table, the actual maximum number of rows per block. For calculations where the full database table is being reviewed Rmax as shown above is preferable to the calculated MRB. In this example calculated MRB and actual MRB is the same (36).

In some implementations, database management server 112 may determine the buffered sequential access efficiency for the database table. For example, FIG. 4 depicts that the buffered sequential access efficiency for the database table with 128 buffers is 14%, with 256 buffers is 16%. In FIG. 4, the buffered sequential access efficiency values are only displayed if the determined value with buffers is higher that a previous entry for the database table. It will be appreciated, however, that the buffered sequential access efficiency may be determined and displayed for all the other sets of buffers (2, 4, 8, 12, 16, 20, 24, 28, 32, 48, 64, and 96) without departing from the spirit of the invention.

In some implementations, database management server 112 may determine a adjusted sequential access efficiency (AMRB) for the database table (depicted in the second line in section 406). In some implementations, the adjusted sequential access efficiency may be determined based on the actual number of blocks with data. The adjusted sequential access efficiency may be determined by the following equation:

$$PBC_A/N_{BC} \qquad (7),$$

Where $PBC_A$ represents an adjusted PBC for the database table and $N_{BC}$ represents the actual number of block changes for the database table.

In some implementations, $PBC_A$ may be determined based on the following equation:

$$\text{Blocks with data}-1 \qquad (8).$$

Thus, the adjusted sequential access efficiency for the database table may be determined as (888)/6,931=13%.

In some implementations, the adjusted sequential access efficiency differs from the MRB access efficiency in that the adjusted sequential efficiency does not penalize the efficiency rating for data blocks that are not completely full (MRB). In other words, at the database table level MRB sequential efficiency is based on the all data rows being in order (by native sequence key) and all data blocks having the maximum number of rows per block. The adjusted sequential efficiency is based on the data row order by native key. Referring to FIG. 4, section 406, in these implementations, the MRB efficiency (first line) and the adjusted sequential efficiency (second line) are the same because the data blocks are full (of rows). In the example FIG. 4A, the same information is displayed and calculated for the table in section 402 and 404. However, in this figure the REO table has had significant data row additions and deletions of data rows which has spread the data rows across more data blocks. This is evidenced by the fact that the average rows per block in section 406 has dropped from 36 (in FIG. 4) to 18 in (FIG. 4A). In FIG. 4A section 406 we now see that the MRB Efficiency rating may be determined as (32,437/36)/4,917=18% while the adjusted MRB Efficiency rating may be determined as (1796)/4,917=36%.

In some implementations, database management server 112 or a database administrator (or other user) may determine whether a database reorganization process for one or more reference groups and/or the complete database table should be performed. In some implementations, the determination may be based on the sequential access efficiency and/or the buffered sequential access efficiency values. In some implementations, a determination that a reorganization should be performed is made when the sequential access efficiency and/or the buffered sequential access efficiency reaches below a particular threshold (for example, less than 50%). In some implementations, the determination may be based on the information included in the generated report. In some implementations, based on the report of FIG. 4A for example, the low sequential access efficiency for the reference group(s) and/or table combined with the low buffered sequential access efficiency for the reference group(s) and/or table indicates that a data reorganization process should be performed.

In some implementations, the sequential access efficiency and/or buffered sequential access efficiency values provide an efficient and accurate method for determining whether a database reorganization process should be performed. This may reduce the number of database outages or other disruptions to perform unnecessary reorganizations. Reducing the number of resources consumed by unnecessary reorganizations may improve the overall 24×7 database availability.

In some implementations, in response to a determination that a database reorganization process should be performed, database management server 112 may trigger the database reorganization process for the reference group(s), the database table, and/or other segment or grouping of the database. In some implementations, the database reorganization process may extract the data rows from the reference group(s), table, and/or other segment, re-order the data rows according to the native key sequence, and replace the ordered data rows into the reference group(s), table, and/or other segment.

FIG. 5 depicts an exemplary report generated by database management server 112 after the database reorganization process on the reference group(s) and/or database table of FIG. 4A has been performed, according to various aspects of the invention. As illustrated in FIG. 5, the sequential access efficiency and/or the buffered sequential access efficiency for the reference group(s) and the database table is 100% because the data row sequence follows the native key sequence. In some implementations, the report of FIG. 5 may depict the sequential access efficiency and the buffered sequential access efficiency after an offline database reorganization process is performed. In implementations where an online database reorganization is utilized, the results may not reach 100% efficiency. This is due to limitations on how thoroughly the data can be reorganized while it is still being actively updated by users.

In some implementations, the reports of FIGS. 4, 4A and 5 may be generated while the database is online (i.e., open for processing).

In some implementations, a report generated after an online database reorganization process is performed may indicate an amount of improvement the online reorganization process provided based on the sequential access efficiency and/or buffered sequential access efficiency values. Also, these values may further may be used to determine whether another online database reorganization should be performed.

In some implementations, database tables and/or data rows in the database tables may be compressed by database management server 112 before storing them on DASD 120 in the form of, for example, compressed data rows in the data blocks. Thus, the various operations described above may be performed by database management server 112 on the compressed tables/rows. Because the amount of compression found in each data row will vary, the efficiency rating process may use the alternative scanning method (as described above) to determine the MRB value for the reference group analysis (FIG. 4 section 404). The actual MRB value is known for the full table (FIG. 4 Section 406) calculations. While compressed rows may add a certain amount of variance to the reference group calculations, the efficiency estimates will be within reason and the full table MRB and AMRB will reflect the table's actual efficiency.

Figure 6:
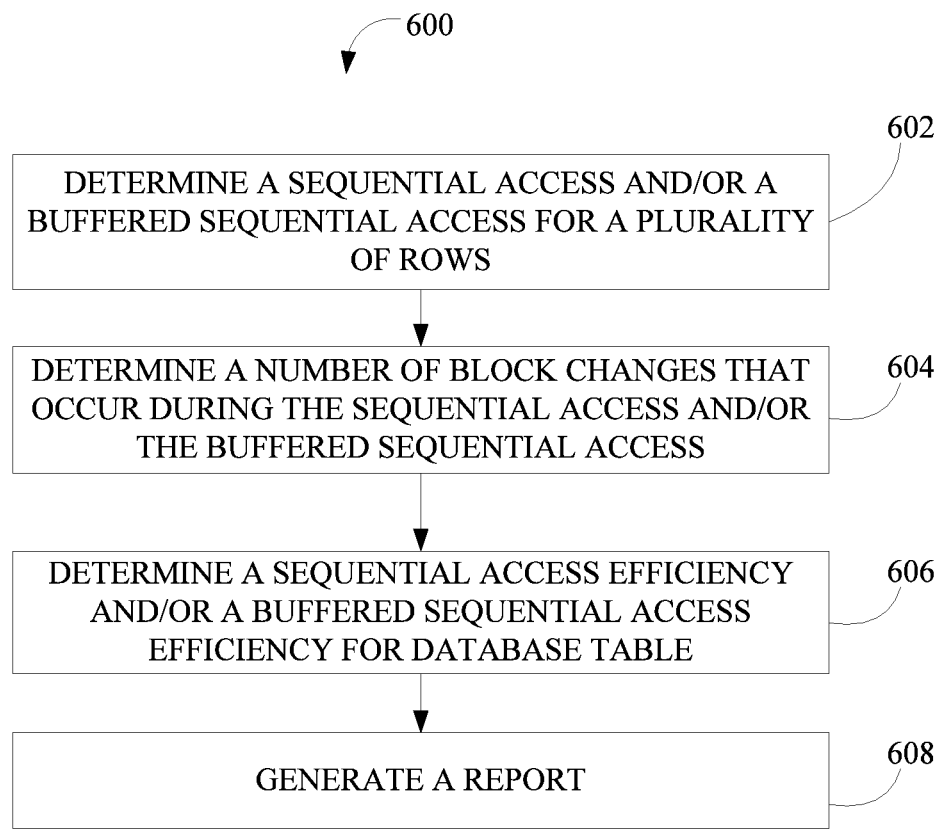
FIG. 6 is a flowchart depicting example operations performed by a database management system to determine sequential access efficiency for a database table, according to various aspects of the invention.

FIG. 6 is a flowchart 600 depicting example operations performed by a database management server 112 to determine sequential and/or buffered sequential access efficiencies, according to various aspects of the invention. The various processing operations depicted in FIG. 6 and other figures are described in greater detail herein. The described operations for a flow diagram may be accomplished using some or all of the system components described in detail above and, in some implementations of the invention, various operations may be performed in different sequences. In some implementations, additional operations may be performed along with some or all of the operations shown in FIG. 6. In yet other implementations, one or more operations may be performed simultaneously. In yet other implementations, one or more operations may not be performed. Accordingly, the operations described are exemplary in nature and, as such, should not be viewed as limiting.

In operation 602, process 600 may determine a sequential access and/or a buffered sequential access for a plurality of rows of a database tables. In some implementations, a sequential access occurs when at least a portion of the database table is accessed. In some implementations, determining a sequential access may include accessing the plurality of rows of the database table sequentially according to the native key sequence. In some implementations, determining a sequential access may include using a least recently used (LRU) algorithm to determine how the data blocks storing the plurality of rows have been accessed.

In some implementations, process 600 may determine a buffered sequential access of a plurality of rows of a database table based on a number of buffers used to buffer the buffered sequential access (for example, 2 buffers, 4 buffers, 8 buffers, and so on). In some implementations, determining a buffered sequential access may include accessing the plurality of rows of the database table sequentially according to the native key sequence utilizing a set number of buffers.

In operation 604, process 600 may determine a number of data block changes that occur during the sequential access of the plurality of rows in the database table. In some implementations, process 600 may determine a number of data block changed that occur during the buffered sequential access of the plurality of rows in the database table.

In operation 606, process 600 may determine a sequential access efficiency and/or a buffered sequential access efficiency for the database table. In some implementations, determining a sequential access efficiency for the database table may include determining the sequential access efficiency based on the determined number of data block changes that occur during the sequential access. In some implementations, determining a buffered sequential access efficiency for the database table may include determining a buffered sequential access efficiency based on the determined number of data block changes that occur during the buffered sequential access and the number of data buffers utilized to buffer the first buffered sequential access.

In operation 608, process 600 may generate a report. In some implementations, the generated report may include the determined sequential access efficiency and/or the determined buffered sequential access efficiency based on the number of buffers (for example, 2 buffers, 4 buffers, 8 buffers, and so on).

In some implementations, one or more operations of process 600 may be performed in response to a user request (or other request) to determine a sequential access efficiency and/or buffered sequential access efficiency for a database table, or in response to a user request (or other request) to generate a report describing the sequential access efficiency and/or buffered sequential access efficiency for a database table. In some implementations, the request(s) may include one or more parameters identifying the database table for which the sequential access efficiency is to be determined, a native key sequence for the database table, reference group size, and/or other parameters.

In some implementations, one or more operations of process 600 may be performed while the database is online. In some implementations, one or more operations of process 600 may be performed while the database is offline.

Figure 7:
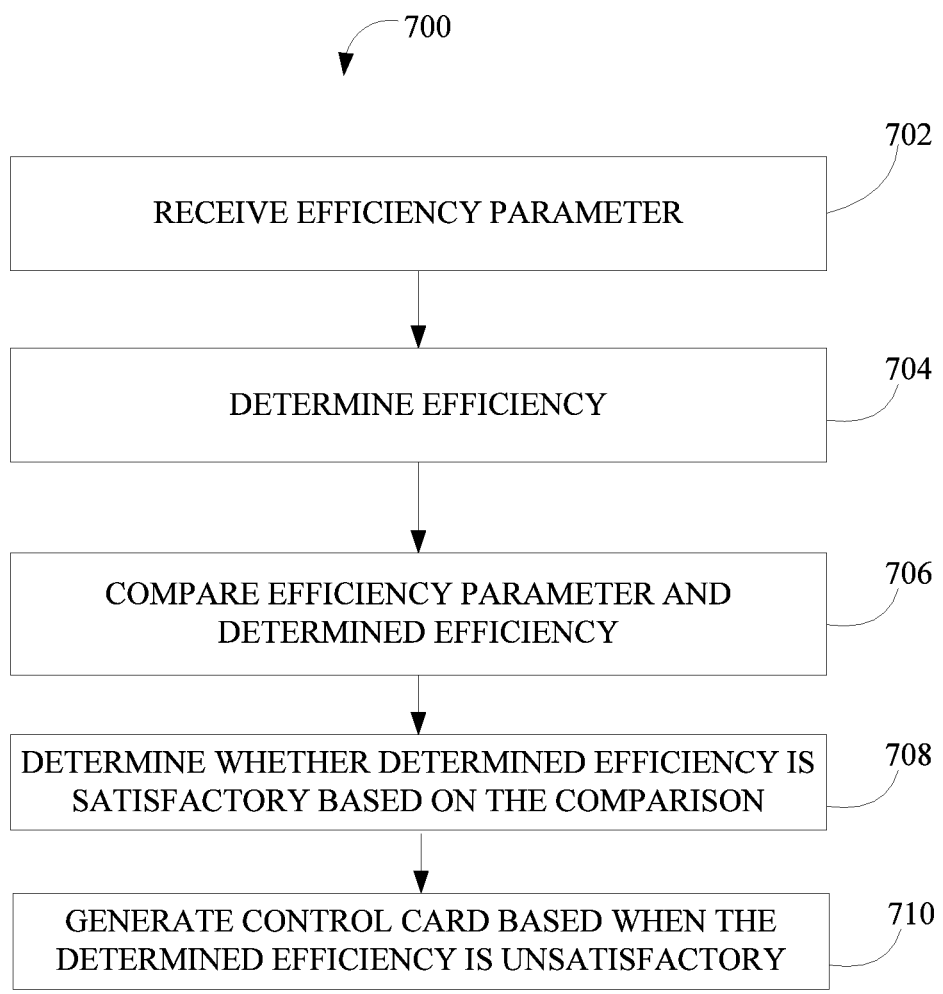
FIG. 7 is a flowchart illustrating a process for automatically reorganizing segments/groups of rows of a database table, according to various aspects of the invention.

FIG. 7 is a flowchart illustrating a process 700 for automatically reorganizing segments/groups of rows of a database table, according to various aspects of the invention. Process 700 may be performed by database management server 112 or other device configured to determine an organizational efficiency of at least a portion of a database table and automatically cause a reorganization of the portion of the database table based on the determined organizational efficiency. For example, process 700 may determine organizational efficiencies of various segments or groups of rows of a database table and automatically schedule or otherwise cause a reorganization of a segment that is determined to have an unsatisfactory level of organizational efficiency.

In an operation 702, process 700 may receive an efficiency parameter that indicates a satisfactory level of organizational efficiency of at least a portion of the database table. A level of organizational efficiency may be based on a number of data block changes that occur while sequentially accessing the table and may be expressed as a sequential access efficiency, as described above with respect to FIGS. 2-5. For example, a portion (or segment) of a database table that requires more block changes while sequentially being accessed has a lower organizational efficiency than when fewer data block changes are necessary.

In an operation 704, process 700 may determine an efficiency associated with a group of rows of the database table based on a determined number of data block changes that occur during the sequential access of the group of rows. In some implementations, the efficiency may be determined as described in operations 602-606 of FIG. 6.

In an operation 706, process 700 may compare the determined efficiency and the efficiency parameter. For example, a database administrator may determine that an efficiency of at least 60% sequential access efficiency is satisfactory for a group of rows and may set the efficiency parameter to 60%. Process 700 may receive the efficiency parameter and compare this with an efficiency determined for the group of rows to determine whether the determined efficiency is greater than, equal to or less than the received efficiency parameter. As would be appreciated, the efficiency parameter and determined efficiency, while described as a percentage, may be expressed using other values such as ratios, decimals, or other values that can be compared to each other.

In an operation 708, process 700 may determine whether the determined efficiency is satisfactory based on the comparison. For example, when the determined efficiency is less than 60%, process 700 may determine that the efficiency is unsatisfactory. On the other hand, when the determined efficiency is greater than 60%, process 700 may determine that the efficiency is satisfactory.

In an operation 710, process 700 may generate a control card to reorganize the group of rows when the efficiency is not satisfactory. In some implementations, the control card causes a reorganization of the group of rows. For example, the control card may include a request that identifies the database table and the group of rows to be reorganized. The request may be made to an online reorganization process, thereby causing reorganization of the group of rows.

In some implementations, in operation 708, process 700 may generate a control card that includes a refgroup parameter, which specifies a level of reorganization to be achieved. In some implementations, the refgroup parameter may specify [LEVELS OF REORG].

Figure 8:
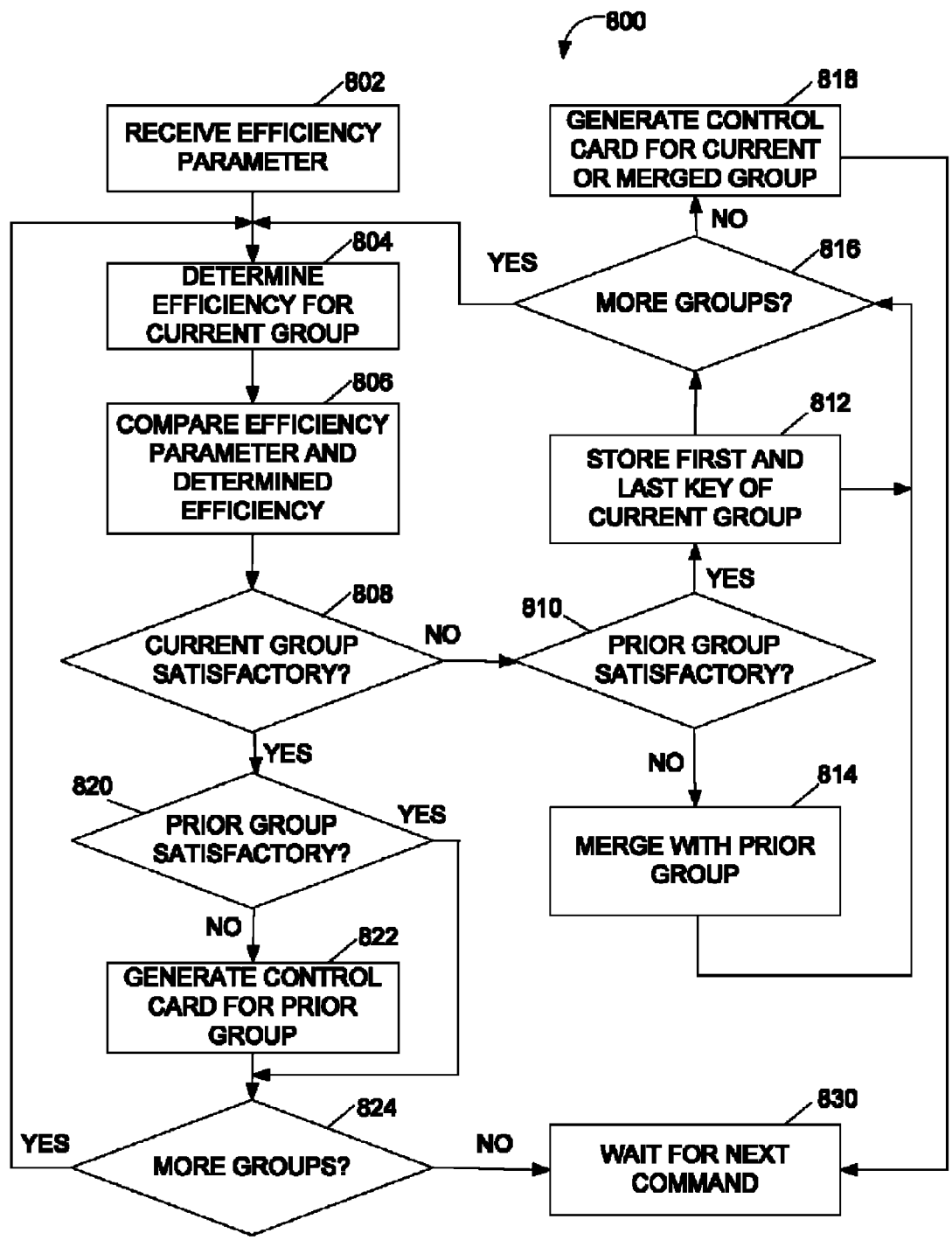
FIG. 8 is a flowchart illustrating a process for automatically iterating through groups of rows of a database table to assess and reorganize the groups of rows, according to various aspects of the invention.

FIG. 8 is a flowchart illustrating a process 800 for automatically iterating through groups of rows of a database table to assess and reorganize the groups of rows, according to various aspects of the invention.

In an operation 802, process 800 may receive an efficiency parameter. In some implementations, the efficiency parameter is described above with respect to operation 702 of FIG. 7.

In an operation 804, process 800 may determine an efficiency of a current group of rows. The current group of rows may be a group of rows that is currently undergoing processing (i.e., for which an efficiency is determined). In these implementations, the database table includes more than one group of rows each processed to determine their efficiency and potentially reorganized based on its efficiency. In some implementations, the efficiency may be determined in a manner similar to that described above with respect to operation 704 of FIG. 7.

In an operation 806, process 800 may compare the determined efficiency with the efficiency parameter. In some implementations, the comparison may be performed in a manner similar to that described above with respect to operation 706 of FIG. 7.

In an operation 808, process 800 may determine whether the efficiency for the current group of rows is satisfactory based on the comparison. In some implementations, the determination may be performed in a manner similar to that described above with respect to operation 708 of FIG. 7.

In operation 808, when the current group of rows is determined to be unsatisfactory, in an operation 810, process 800 may determine whether an efficiency of a prior group of rows is satisfactory. When the efficiency of a prior group of rows is satisfactory (or when the current group of rows is the first group of rows processed in the database table such that there are no prior group of rows), the current group of rows is stored in memory.

For example, a first key parameter and a last key parameter that respectively identifies the first and last rows of the current group of rows may be stored. In this manner, the current group of rows is flagged for reorganization because it is determined to be inefficient. In some implementations, the first key parameter includes a first value of the first row and the last key parameter includes a last value of the last row.

In some implementations, process 800 proceeds to an operation 816, where it is determined whether the database table includes more groups of rows for processing.

Returning to operation 810, when the efficiency of the prior group of rows is determined to be unsatisfactory, process 800 may proceed to an operation 814, where the current group of rows is merged with the prior group of rows. In these implementations, the current group of rows and the prior group of rows are both determined to be unsatisfactory and may be merged, or treated as a single group of rows for reorganization. In some implementations, the current and prior groups of rows are merged by replacing the last key parameter of the prior group of rows (stored when the prior group of rows was processed according to operation 812) with the last key parameter of the current group of rows. In other words, operation 814 flags the prior group of rows and the current group of rows for reorganization by identifying the first row of the prior group of rows and the last row of the current group of rows (and any intervening rows) for reorganization. Process 800 may then proceed to operation 816.

In operation 816, process 800 may determine whether more groups of rows are to be processed. When no more groups of rows are to be processed, such as when the current group of rows is the last group of rows of the database table, then process 800 may proceed to an operation 818, where a control card is generated for the current or merged group of rows. The control card identifies and causes reorganization of a group of rows. Processing may proceed to operation 830 described above.

Returning to operation 816, when at least one more group of rows is to be processed, process 800 may return to operation 804, where an efficiency of the current (in this case, next) group of rows is determined.

Returning to operation 808, when the current group of rows is determined to be satisfactory, in an operation 820, process 800 may determine whether an efficiency of a prior group of rows is satisfactory. When the efficiency of a prior group of rows is satisfactory (or when the current group of rows is the first group of rows processed in the database table such that there are no prior group of rows), process 800 may proceed to an operation 824, where process 800 determines whether more groups of rows are to be processed.

Returning to operation 820, when the prior group of rows is determined to be unsatisfactory, process 800 may proceed to an operation 822, where a control card may be generated for the prior group. As described above, the control card may cause reorganization of a group of rows identified by the control card. Process 800 may then proceed to operation 824.

In operation 824, process 800 may determine whether more groups of rows are to be processed. When no more groups of rows are to be processed, such as when the current group of rows is the last group of rows of the database table, then process 800 may terminate or otherwise wait in an operation 830 until a command to initiate process 800 is received at a later time. For example, a database administrator or automated script may communicate a request to start process 800 along with an efficiency parameter as described above.

Returning to operation 824, when at least one more group of rows is to be processed, process 800 may return to operation 804, where an efficiency of the current (in this case, next) group of rows is determined.

According to various implementations of the invention, process 800 may be used iterate through different segments or groups of rows of a database table to identify groups of rows that are inefficient and cause the identified groups of rows to be reorganized. In some implementations, any two or more adjacent groups of rows that are inefficient may be merged and treated as a single group of rows for reorganization purposes.

Implementations of the invention may be made in hardware, firmware, software, or various combinations thereof. Implementations of the invention may also be implemented as computer-readable instructions stored on a tangible computer-readable storage medium which may be read and executed by one or more processors. A tangible computer-readable storage medium may include any tangible, non-transitory, mechanism for storing or transmitting information in a form readable by a machine (e.g., a computing device). For example, a tangible computer-readable storage medium may include read only memory, random access memory, magnetic disk storage media, optical storage media, flash memory devices, and/or other tangible storage media. Intangible machine-readable transmission media may include intangible forms of propagated signals, such as carrier waves, infrared signals, digital signals, and/or other intangible transmission media. Further, firmware, software, routines, or instructions may be described in the above disclosure in terms of specific exemplary aspects and implementations of the invention and performing certain actions. However, it will be apparent that such descriptions are merely for convenience, and that such actions may in fact result from computing devices, processors, controllers, or other devices executing firmware, software, routines or instructions.

Implementations of the invention may be described as including a particular feature, structure, or characteristic, but every aspect or implementation may not necessarily include the particular feature, structure, or characteristic. Further, when a particular feature, structure, or characteristic is described in connection with an aspect or implementation, it will be understood that such feature, structure, or characteristic may be included in connection with other implementations, whether or not explicitly described. Thus, various changes and modifications may be made to the provided description without departing from the scope or spirit of the invention.

Other embodiments, uses and advantages of the invention will be apparent to those skilled in the art from consideration of the specification and practice of the invention disclosed herein. The specification and drawings should be considered exemplary only, and the scope of the invention is accordingly intended to be determined solely by the appended claims.

What is claimed is:

1. A computer-implemented method for reorganizing data records of a database, comprising:
   receiving, by a processor of a server, an efficiency parameter that indicates a satisfactory level of organizational efficiency of at least a portion of a database table having a group of rows stored using a plurality of data blocks, wherein a level of organizational efficiency is based on a number of data block changes that occur while sequentially accessing the database table, and wherein a data block change occurs when a current row is stored in a first data block and a next row is stored in a second data block that is different from the first data block such that accessing the next row after accessing the current row results in the data block change,
   determining, by the server, a number of data block changes that occur during a sequential access of the group of rows;
   determining, by the server, an efficiency associated with the group of rows based on the determined number of data block changes that occur during the sequential access of the group of rows, wherein the efficiency is calculated based on a number of buffers used while sequentially accessing the database table, and wherein the data block change is not counted in determining the efficiency if the second data block being accessed is already present in one of the number of buffers;
   comparing, by the server, the determined efficiency and the efficiency parameter;
   determining, by the server, whether the determined efficiency is satisfactory based on the comparison; and generating, by the server, a control card to reorganize the group of rows when the efficiency is not satisfactory, the control card causing a reorganization of the group of rows.

2. The computer-implemented method of claim 1, wherein generating a control card comprises generating a control card comprising a refgroup parameter, wherein the refgroup parameter indicates a level of organizational efficiency to be achieved during the reorganization of the group of rows.

3. The computer-implemented method of claim 1, wherein generating a control card comprises generating a control card comprising a first key parameter that indicates a start of the group of rows.

4. The computer-implemented method of claim 3, wherein the first key parameter comprises a key value of a first row of the group of rows.

5. The computer-implemented method of claim 3, wherein generating a control card comprises generating a control card comprising a last key parameter that indicates an end of the group of rows.

6. The computer-implemented method of claim 5, wherein the last key parameter comprises a key value of a last row of the group of rows.

7. The computer-implemented method of claim 1, wherein the group of rows comprises a subset of all the rows of the database table.

8. The computer-implemented method of claim 7, the method further comprising:
    determining, by the server, a number of data block changes that occur during a sequential access of a second group of rows;
    determining, by the server, a second efficiency associated with the group of rows based on the determined number of data block changes that occur during the sequential access of the second group of rows;
    comparing, by the server, the determined second efficiency and the efficiency parameter; and
    determining, by the server, whether the determined second efficiency is satisfactory based on the comparison,
        wherein generating a control card comprises generating a control card to reorganize the group of rows and the second group of rows when the determined efficiency and the determined second efficiency are not satisfactory.

9. The computer-implemented method of claim 8, wherein generating a control card comprises generating a control card that causes a reorganization of the group of rows and the second group of rows by indicating the group of rows and the second group of rows as a single group of rows.

10. A computer-implemented system for reorganizing data records of a database, comprising:
    a server comprising a processor configured to:
        receive an efficiency parameter that indicates a satisfactory level of organizational efficiency of at least a portion of a database table having a group of rows stored using a plurality of data blocks,
            wherein a level of organizational efficiency is based on a number of data block changes that occur while sequentially accessing the database table, and
            wherein a data block change occurs when a current row is stored in a first data block and a next row is stored in a second data block that is different from the first data block such that accessing the next row after accessing the current row results in the data block change;
        determine a number of data block changes that occur during a sequential access of the group of rows;
        determine an efficiency associated with the group of rows based on the determined number of data block changes that occur during the sequential access of the group of rows, wherein the efficiency is calculated based on a number of buffers used while sequentially accessing the database table, and wherein the data block change is not counted in determining the efficiency if the second data block being accessed is already present in one of the number of buffers;
        compare the determined efficiency and the efficiency parameter;
        determine whether the determined efficiency is satisfactory based on the comparison; and
        generate a control card to reorganize the group of rows when the efficiency is not satisfactory, the control card causing a reorganization of the group of rows.

11. The computer-implemented system of claim 10, wherein the server is further configured to: generate a control card that comprises a refgroup parameter, wherein the refgroup parameter indicates a level of organizational efficiency to be achieved during the reorganization of the group of rows.

12. The computer-implemented system of claim 10, wherein the server is further configured to generate a control card that comprises a first key parameter that indicates a start of the group of rows.

13. The computer-implemented system of claim 12, wherein the first key parameter comprises a key value of a first row of the group of rows.

14. The computer-implemented system of claim 12, wherein the server is further configured to generate a control card that comprises a last key parameter that indicates an end of the group of rows.

15. The computer-implemented system of claim 14, wherein the last key parameter comprises a key value of a last row of the group of rows.

16. The computer-implemented system of claim 10, wherein the group of rows comprises a subset of all the rows of the database table.

17. The computer-implemented system of claim 16, wherein the server is further configured to:
    determine a number of data block changes that occur during a sequential access of a second group of rows;
    determine a second efficiency associated with the group of rows based on the determined number of data block changes that occur during the sequential access of the second group of rows;
    compare the determined second efficiency and the efficiency parameter; and
    determine whether the determined second efficiency is satisfactory based on the comparison,
        wherein the control card causes reorganization of the group of rows and the second group of rows when the determined efficiency and the determined second efficiency are not satisfactory.

18. The computer-implemented system of claim 17, wherein the control card causes a reorganization of the group of rows and the second group of rows by indicating the group of rows and the second group of rows as a single group of rows.

19. A non-transitory computer-readable storage medium having one or more computer-readable instructions thereon which when executed by a processor cause the processor to:
    receive an efficiency parameter that indicates a satisfactory level of organizational efficiency of at least a portion of a database table having a group of rows stored using a plurality of data blocks, wherein a level of organizational efficiency is based on a number of data block changes that occur while sequentially accessing the database table, and wherein a data block change occurs when a current row is stored in a first data block and a next row is stored in a second data block that is different from the first data block such that accessing the next row after accessing the current row results in the data block change;

determine a number of data block changes that occur during a sequential access of the group of rows;

determine an efficiency associated with the group of rows based on the determined number of data block changes that occur during the sequential access of the group of rows, wherein the efficiency is calculated based on a number of buffers used while sequentially accessing the database table, and wherein the data block change is not counted in determining the efficiency if the second data block being accessed is already present in one of the number of buffers;

compare the determined efficiency and the efficiency parameter;

determine whether the determined efficiency is satisfactory based on the comparison; and generate a control card to reorganize the group of rows when the efficiency is not satisfactory, the control card causing a reorganization of the group of rows.

20. The non-transitory computer-readable storage medium of claim 19, wherein the instructions further configure the processor to: generate a control card that comprises a refgroup parameter, wherein the refgroup parameter indicates a level of organizational efficiency to be achieved during the reorganization of the group of rows.

21. The computer-implemented method of claim 1, wherein determining an efficiency associated with the group of rows based on the determined number of data block changes comprises calculating a sequential access efficiency using the following equation:

$$(N_B - 1)/N_C$$

wherein $N_B$ is a determined number of data blocks containing data and $N_C$ is the determined number of data block changes.

22. The computer-implemented method of claim 1, wherein determining an efficiency associated with the group of rows based on the determined number of data block changes comprises calculating a sequential access efficiency for the database table using the following equation:

$$((N_r/R_{max}) - 1)/N_T$$

wherein $N_r$ is a determined number of rows per database table, $R_{max}$ is a determined maximum rows per data block, and $N_T$ is the determined number of data block changes for the database table.

* * * * *